(12) United States Patent
Heath et al.

(10) Patent No.: US 9,851,372 B2
(45) Date of Patent: Dec. 26, 2017

(54) METHOD OF MANUFACTURING AN ANEMOMETER USED FOR DETERMINING A FLUID FLOW

(71) Applicant: Linear Technology Corporation, Milpitas, CA (US)

(72) Inventors: Jeffrey Lynn Heath, Santa Barbara, CA (US); Harry Joseph Kleeburg, Goleta, CA (US); Heath Dixon Stewart, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 208 days.

(21) Appl. No.: 14/883,164

(22) Filed: Oct. 14, 2015

(65) Prior Publication Data

US 2016/0033545 A1    Feb. 4, 2016

Related U.S. Application Data

(62) Division of application No. 13/448,075, filed on Apr. 16, 2012, now Pat. No. 9,176,163.
(Continued)

(51) Int. Cl.
*G01R 31/28*    (2006.01)
*G01P 5/02*    (2006.01)
(Continued)

(52) U.S. Cl.
CPC ............... *G01P 5/02* (2013.01); *G01F 1/688* (2013.01); *G01F 1/698* (2013.01); *G01P 1/00* (2013.01); *G01P 5/10* (2013.01)

(58) Field of Classification Search
CPC ...... G01P 1/00; G01P 5/02; G01P 5/10; G01F 1/688; G01F 1/698
See application file for complete search history.

(56) References Cited

U.S. PATENT DOCUMENTS

| 3,968,685 A | 7/1976 | MacHattie |
| 4,848,147 A | 7/1989 | Bailey et al. |

(Continued)

FOREIGN PATENT DOCUMENTS

| EP | 0210509 A1 | 2/1987 |
| WO | 8901132 A1 | 2/1989 |
| WO | 2011010191 A1 | 1/2011 |

OTHER PUBLICATIONS

European Search Report, 7 pages.

*Primary Examiner* — Paul D Kim
(74) *Attorney, Agent, or Firm* — Patent Law Group LLP; Brian D. Ogonowsky (57) ABSTRACT

An anemometer and method for analyzing fluid flow is described. In one embodiment, a transistor sensor is heated by applying power to cause its base-emitter junction to rise from an ambient first temperature to a second temperature. The power is removed, and the Vbe is measured at intervals as the junction cools. The Vbe equates to a temperature of the junction. The temperature exponentially decreases, and the time constant of the decay corresponds to the fluid flow velocity. A best fit curve analysis is performed on the temperature decay curve, and the time constant of the exponential decay is derived by a data processor. A transfer function correlates the time constant to the fluid flow velocity. The transistor is thermally coupled to a metal rod heat sink extending from the package, and the characteristics of the rod are controlled to adjust the performance of the anemometer.

14 Claims, 4 Drawing Sheets

Related U.S. Application Data (60) Provisional application No. 61/559,257, filed on Nov. 14, 2011.

(51) Int. Cl.
  *G01P 5/10* (2006.01)
  *G01F 1/688* (2006.01)
  *G01F 1/698* (2006.01)
  *G01P 1/00* (2006.01)

(56) References Cited

U.S. PATENT DOCUMENTS

| | | | |
|---|---|---|---|
| 5,582,628 A | 12/1996 | Wood | |
| 6,058,787 A * | 5/2000 | Hughes | G01F 1/32 73/861.52 |
| 6,085,588 A | 7/2000 | Khadkikar et al. | |
| 6,889,561 B2 * | 5/2005 | Hussain | G01F 1/8413 73/861.357 |
| 7,836,759 B2 * | 11/2010 | Maute | E21B 47/011 73/152.29 |
| 7,866,207 B2 * | 1/2011 | Maute | E21B 47/102 73/152.29 |
| 8,156,799 B2 * | 4/2012 | Maute | E21B 47/102 73/152.01 |
| 8,230,732 B2 * | 7/2012 | Maute | E21B 47/011 73/152.29 |
| 8,312,767 B2 * | 11/2012 | Maute | E21B 47/102 73/152.29 |
| 8,561,478 B2 * | 10/2013 | Maute | E21B 47/102 73/861.12 |
| 8,844,626 B1 | 9/2014 | Krug | |
| 2005/0092078 A1 | 5/2005 | Ellis et al. | |
| 2008/0034861 A1 | 2/2008 | Bognar | |

* cited by examiner

METHOD OF MANUFACTURING AN ANEMOMETER USED FOR DETERMINING A FLUID FLOW

CROSS-REFERENCE TO RELATED APPLICATIONS

This application is a divisional of U.S. application Ser. No. 13/448,075, filed on Apr. 16, 2012, now U.S. Pat. No. 9,176,163, which is based on, and claims priority from, U.S. provisional application 61/559,257, filed on Nov. 14, 2011, by the present inventors, assigned to the present assignee and incorporated herein by reference.

FIELD OF THE INVENTION

This invention relates to anemometers and, in particular, to a solid state anemometer.

BACKGROUND

Anemometers measure the flow of a fluid, such as air, passing over it. In electrical cabinets or boxes containing heat producing circuitry, it is sometimes necessary to provide a fan for cooling. It is conventional to provide instrumentation in the cabinet that monitors temperature and the flow of air. The most common compact anemometers are hot-wires and thermocouples.

The hot-wire type comprises a wire that has a known resistance-temperature characteristic. In one technique, the wire is heated by a current to achieve a target voltage across it and, as air flows over the wire to cool it, the current is controlled to maintain a constant voltage. The amount of current therefore corresponds to the air velocity once the anemometer is calibrated. Other techniques are also used, such as measuring the time it takes for the wire to cool after being pulsed by a current. Such wires are expensive, are fragile, require frequent cleaning, and require calibration.

A thermocouple is the coupling between two dissimilar metals, where the junction generates a temperature-dependent voltage. For use as an anemometer, as with the hot wire, the node may be heated by a current, and the voltage is measured. Like the hot wires, such thermocouples are expensive, fragile, require frequent cleaning (if exposed), and require calibration.

Hot wires and thermocouples are essentially mechanical devices since their characteristics are highly dependent on their mechanical construction. It would be desirable to create an anemometer using conventional integrated circuit fabrication techniques that is truly solid state, so that the anemometer is inexpensive, rugged, and does not require calibration.

U.S. Pat. No. 3,968,685 discloses an anemometer where a base-emitter voltage drop of a bipolar transistor is compared to a voltage drop across a reference (or compensation) diode. An adjustable current is provided to keep the base-emitter voltage drop equal to the diode voltage drop while the transistor is subjected to an air flow, and this current is equated to air velocity. The diode is use to compensate for ambient temperature changes. It is difficult to prevent the diode voltage drop from being affected by the air flow. Further, the design needs precise calibration to cancel out the voltage drops at ambient temperatures. Further, the transistor is thermally insulated by its plastic package, making its base-emitter junction slow to respond to changes in air velocity.

What is needed is a solid state anemometer that does not suffer from the drawbacks mentioned above and related drawbacks.

SUMMARY

In one embodiment, an anemometer is disclosed that comprises a bipolar transistor packaged to have a metal pad thermally coupled to the transistor. Such a metal pad is sometimes referred to as a thermal pad. The metal pad is electrically insulated from the transistor. The package may be mounted on a printed circuit board (PCB) so that its metal pad is facing away from the PCB.

A metal rod is affixed to the thermal pad by solder or other thermally conductive adhesive. In one embodiment, the metal rod is about 2-3 cm long and less than 2 mm in diameter. The rod may be cylindrical for omnidirectional air flow measurement. The PCB also supports all or part of the control circuitry for the anemometer, whose operation is not significantly affected by temperature.

Power is applied to the transistor, creating a significant collector-emitter current, which raises the base-emitter junction temperature and raises the temperature of the metal rod. The power is then removed, and a small constant base current is applied to create a base-emitter voltage drop. The voltage drop corresponds in a known manner to the temperature of the junction, and this voltage drop is sampled at precise intervals (e.g., at 100 ms intervals) for a period of time (e.g., 1 minute). The readings are converted to digital signals by an analog-to-digital converter (ADC). All processing may be done on the PCB.

Junction temperature samples, derived from the voltage drop samples, are stored in a memory as the transistor cools via the flowing air removing heat from the metal rod. The cooling rate is an exponential decay. The rate of decay is substantially determined by the fixed thermal capacitance of the package/rod and the variable thermal resistance between the junction and the air. The thermal resistance is lowered with increased air flow since more rapidly flowing air creates an increased heat flow from the junction to the air, resulting in more rapid cooling of the junction.

After the cooling cycle is completed (e.g., after 2 minutes), a best fit curve analysis is performed on the temperature decay curve using, for example, a least squares algorithm, and the time constant (TC) of the best fit curve is calculated. The curve will have the general shape of $e^{-t/TC}$, where TC is the thermal time constant. When the time constant equals t, the temperature of the junction has fallen to about 37% of the final temperature. The time constant is determined by the air velocity. A lower time constant equates to an increased air velocity.

The derived time constant is then used in a transfer function to derive the corresponding air flow velocity. The velocity may be communicated to a remote monitor, or may be used to generate a warning signal if it is outside of an acceptable range.

The various calculations mentioned above may be condensed into fewer calculations, and the above description delineates the various conversions as separate steps for clarity of explanation.

The circuitry is robust since the transistor is encased in a package. The circuit does not need calibration for adequate operation since its construction is very repeatable. The circuit is much less expensive than anemometers using hot wires or thermocouples, and the results are substantially consistent from circuit to circuit and time to time.

Variations on the above-described technique and structures are also described.

BRIEF DESCRIPTION OF THE DRAWINGS

Elements that are the same or equivalent are labeled with the same numeral.

DETAILED DESCRIPTION

Figure 1:
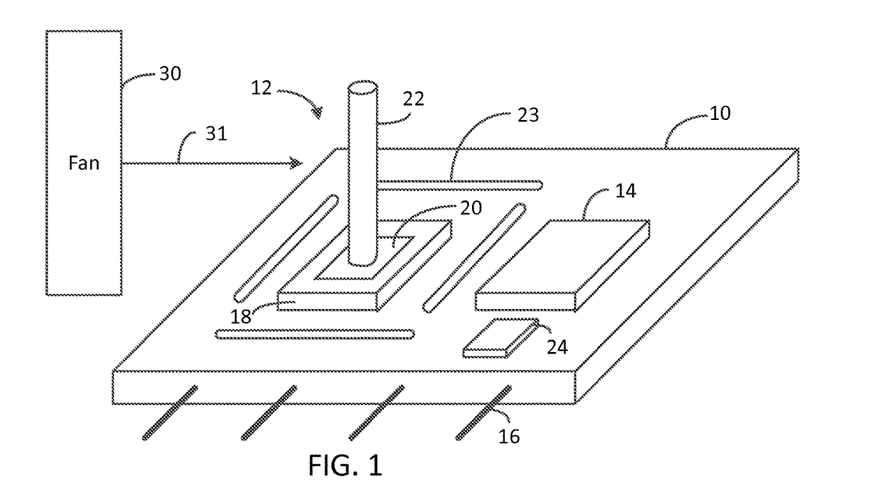
FIG. 1 is a perspective view of a printed circuit board on which is mounted the anemometer sensor and control circuitry.

FIG. 1 illustrates a simplified printed circuit board (PCB) 10 on which is mounted the anemometer sensor 12 and a controller 14. In one embodiment, the PCB 10 is only 3×3 cm or less. The PCB 10 may be conventional and preferably thermally non-conductive. The circuitry on the PCB 10 is connected by copper traces. The PCB's power and I/O pins 16 may be inserted into a socket of a mother board or into a cable connector. In one embodiment, it is desired to know the air flow at various locations in an electrical equipment box, and identical PCBs 10 may be located at various locations in the box.

A bipolar transistor housed in a package 18 is mounted on the PCB 10. The package may be a surface mount package having three or more terminals The package 18 has a metal pad 20 to which the silicon die is thermally coupled. The metal pad 20 is face up. A highly thermally conductive rod 22 is affixed to the thermal pad 20 and acts as a heat sink. In one embodiment, the rod 22 is copper and its shape is cylindrical for omnidirectional detection of air flow. In one embodiment, the rod 22 is less than 2 mm in diameter and about 2-3 cm long. The rod 22 may terminate in a rectangular metal base that is either soldered or otherwise thermally coupled, such as with a thermally conductive epoxy, to the metal pad 20.

Slots 23 formed through the PCB 10 effectively thermally insulate the package 18 from other heat sources on the PCB 10.

In one embodiment, the package 18 is mounted over a thermally insulating pad or an air gap to prevent the PCB 10 from acting as a heat sink for the transistor. This will improve consistency in the air flow velocity measurements from system to system since the tolerances of the PCB 10 and its connection to other heat sources and heat sinks will not affect the anemometer. The wires connecting the transistor to the PCB 10 terminals should be as thin as possible to minimize the transfer of heat between the transistor and the PCB 10.

An optional temperature sensor 24 is also mounted on the PCB 10 for determining the temperature of the PCB 10. The ambient air temperature may be optionally detected by the sensor 12 by measuring the base-emitter voltage drop while the sensor 12 is not being used for detecting air flow velocity.

A fan 30 draws cool air 31, through a filter, from outside the box, and the heated air escapes though vents in the box. The sensor 12 may be placed directly in front of the fan 30 to detect the air flow generated by the fan 30 or may be located in other locations in the box to detect if there is adequate air circulation.

Cooling efficiency is the ability to remove heat from an object (e.g., a transistor) and is a function of air flow over it, air temperature, object temperature, humidity, barometric pressure, surface contamination (dust), and other factors. For short periods of time, all factors except the object temperature may be assumed to be constant and the air flow rate may be suitably derived using the techniques described herein. For more accurate measurement, the PCB 10 temperature may be taken into account as well as any detected air temperature transients.

Since the bipolar transistor die, package 18, and rod 22 may be fabricated to strict tolerances and specifications (the packaged transistor must meet its data sheet specifications), their performance can be very predictable without any calibration by the user.

Figure 2:
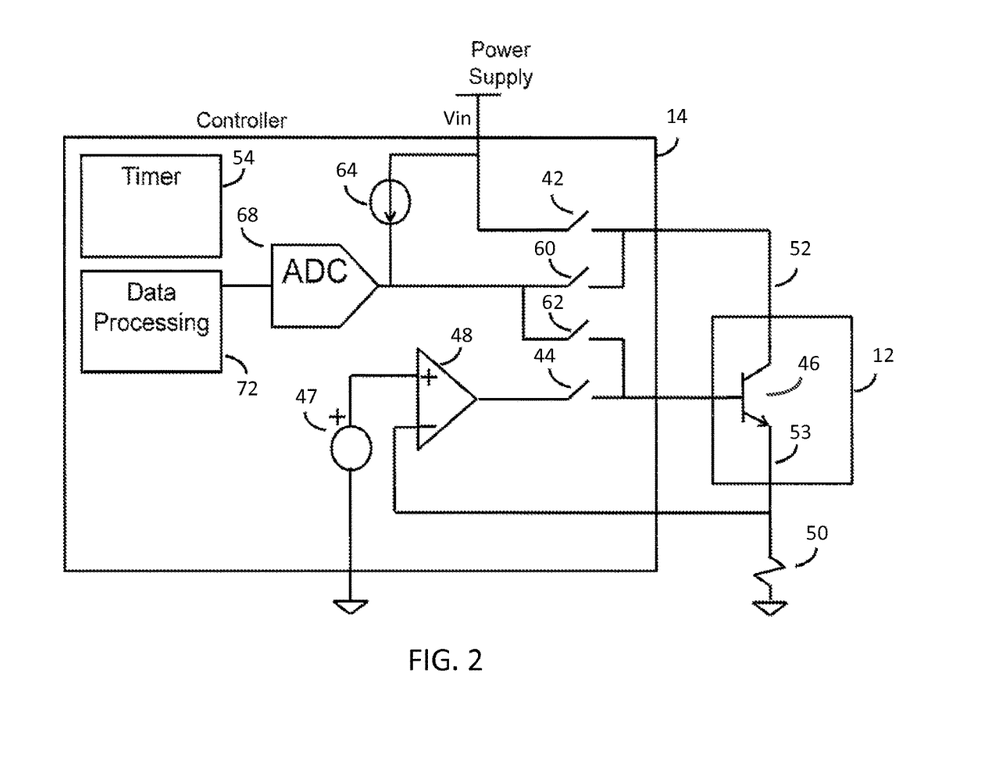
FIG. 2 is a schematic diagram of one embodiment of the invention.

FIG. 2 is a schematic diagram of one embodiment of the invention, which may be entirely contained on the PCB 10. The various switches in FIG. 2 may be transistor switches.

Figure 3:
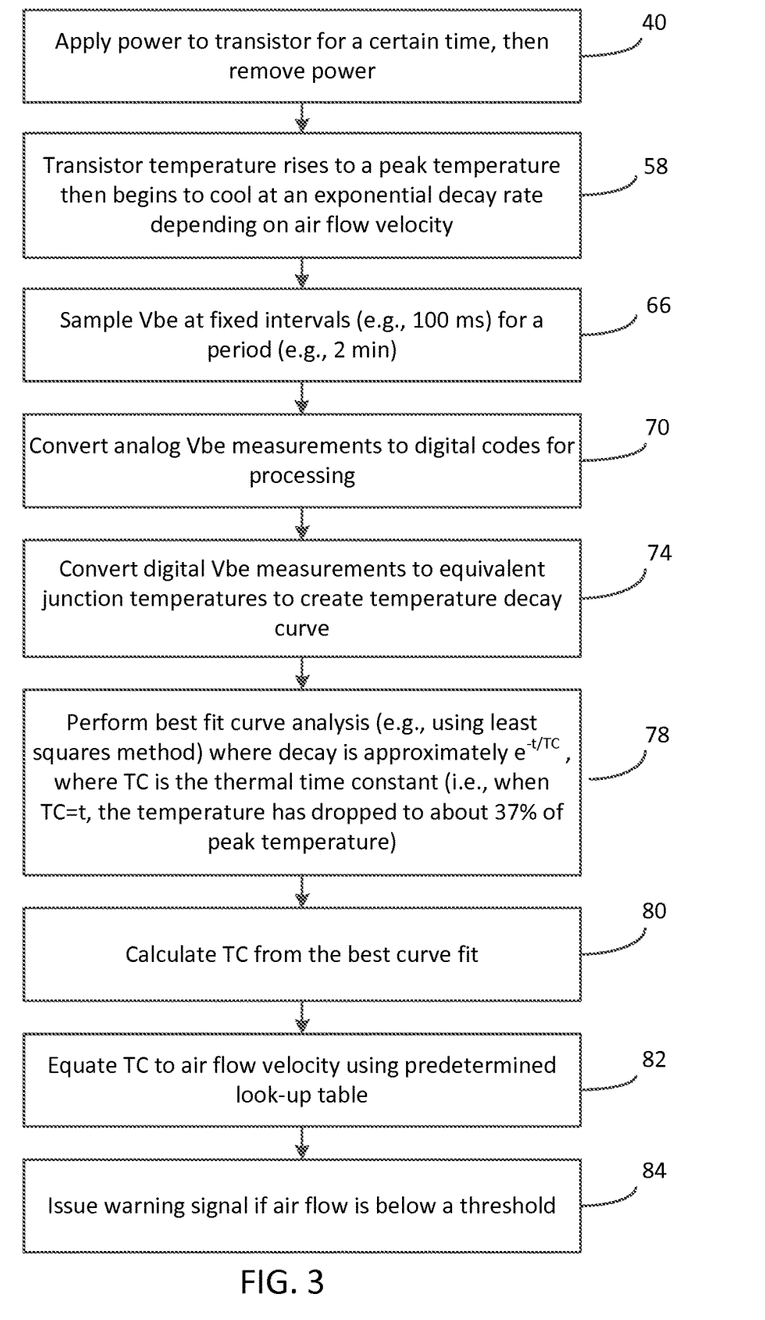
FIG. 3 is a flow chart of a process performed by the circuitry of FIG. 2 in accordance with one embodiment of the invention to derive air flow velocity.

FIG. 3 is a flow chart of a process performed by the circuitry of FIG. 2 in accordance with one embodiment of the invention to derive air flow velocity. In an actual embodiment, the various algorithms and steps identified in FIG. 3 may be condensed into fewer algorithms to save processing time, but the algorithms are delineated in FIG. 3 for clarity of explanation.

In step 40 of FIG. 3, the switches 42 and 44 are closed to drive the transistor 46 at a certain current for a certain time to heat it. The transistor 46 may be any bipolar transistor in a suitable package with a metal thermal pad, available from a variety of manufacturers. A reference voltage source 47 provides a fixed reference voltage to one input of a differential amplifier 48, and its other input is the voltage at the emitter resistor 50. The current through the transistor 46 is set so that the voltage at the resistor 50 equals the reference voltage. The optimal current is dependent on the type of transistor 46 used and is preferably relatively high to quickly heat the transistor, such as 80% of its rated current. The amount of heating is determined by the current times the voltage across the transistor 46 (between nodes 52 and 53). This power is dissipated by the transistor 46 during the heating cycle. A timer 54, which includes a clock and a state machine, controls the timing of the various switches and the processing.

Figure 4:
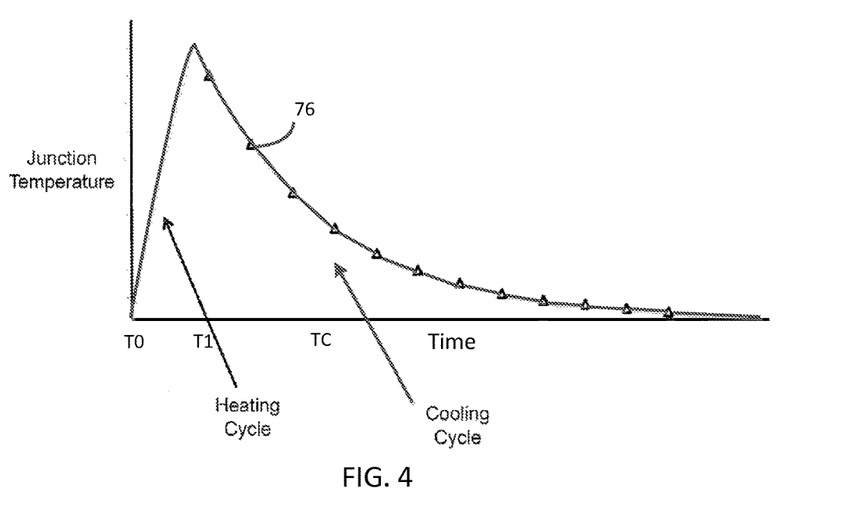
FIG. 4 is a graph of the base-emitter junction temperature vs. time, showing the heating and cooling cycles and samples taken.

In step 58, the transistor 46 temperature rises to a peak temperature, determined by the power and the timer 54. The temperature does not have to level off, and the absolute temperatures are not relevant to the determination of air flow velocity. FIG. 4 illustrates the temperature rise of the base-emitter junction during the heating cycle from time T0-T1.

At time T1, the timer 54 opens switches 42 and 44 and closes switches 60 and 62, causing the base and collector to be shorted and the current from the current source 64 to flow through the base-emitter junction to create a Vbe diode drop. The Vbe is dependent on temperature in a well-known manner.

The standard equation for current through a diode is:

$$I=I_S*(\exp(V/(n*k*T/q))-1) \qquad \text{Eq. 1}$$

Where:
I is the current through the diode
$I_S$ is the reverse saturation current
V is the voltage across the diode
n is a junction constant (typically around 2 for diodes, 1 for transistors, determined empirically)
k is Boltzmann's constant, 1.38E-23 Joules/Kelvin
T is temperature in Kelvin, and
q is the magnitude of an electron charge, 1.609E-19 coulombs.

The sub-expression, k*T/q, has units of voltage and is referred to as the thermal voltage VT. VT is typically around 26 millivolts at room temperature.

Equation 1 can be solved for the forward voltage as:

$$V=n*VT*\ln[(I/I_S)+1] \qquad \text{Eq. 2}$$

Accordingly, given that the current I of the current source 64 is known, the diode drop V (i.e., Vbe) is known by measurement, and the constants are known for the particular transistor (e.g., provided by the transistor manufacture or otherwise determined empirically), the only unknown is the junction temperature T, which is easily calculated.

In step 66 of FIG. 3, the Vbe is measured by the timer 54 controlling the analog-to-digital converter (ADC) 68 to sample the Vbe at certain intervals, such as at 100 ms intervals. The ADC 68 may have any resolution, such as from 14 to 24 bits, depending on the accuracy desired. The emitter voltage is equal to the current source 64 current times the resistor 50 value, and the base voltage is detected via the closed switch 62.

Figure 5:
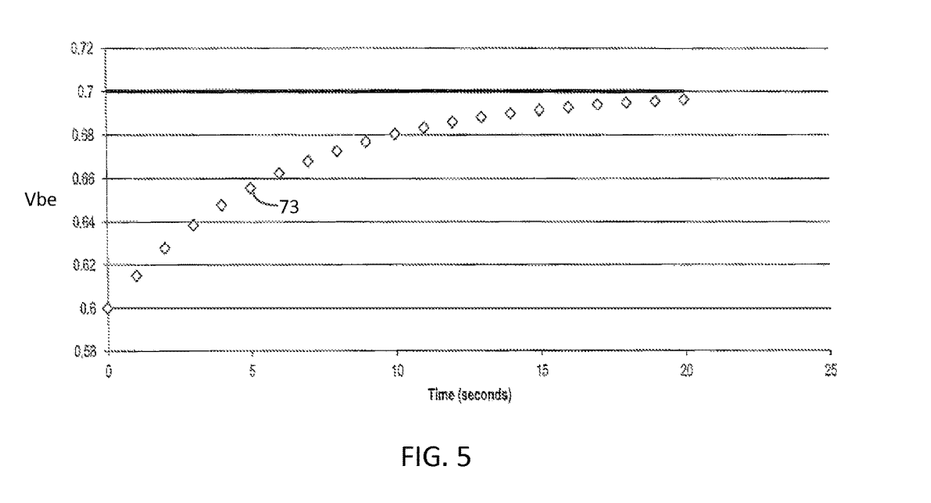
FIG. 5 is a graph of the base-emitter voltage drop (Vbe) vs. time as the sensor cools and the various measurements taken to derive air flow velocity.

In step 70, the ADC 68 converts the Vbe measurements to digital codes for digital processing by the data processing circuit 72. FIG. 5 illustrates an example of the Vbe values 73 measures during the cooling cycle over 20 seconds, where the Vbe had an initial value of about 0.6 volts at the beginning of the cooling cycle and a voltage of about 0.7 volts at 20 seconds.

In step 74, the data processing circuit 72 uses Equation 2 to calculate the junction temperature associated with each Vbe measurement. These temperatures are then stored in a memory as part of the data processing circuit 72, and the temperature value set defines an exponential decay curve. FIG. 4 illustrates temperature values 76 derived from the Vbe samples and stored in the memory. The data processing circuit 72 may use firmware to perform all calculations or may use a programmed microprocessor. As stated previously, the various conversions described herein may be condensed into fewer steps, and the steps in FIG. 3 are delineated for clarity of explanation. For example, the conversion from the Vbe data to the temperature data need not be performed, and a conversion algorithm (a transfer function) is used to convert the time constant of the Vbe decay directly to the air flow velocity.

In step 78, after a predetermined period (e.g., 2 minutes) or after it is determined that sufficient cooling has taken place (e.g., the delta temperature or Vbe values are approximately zero), the data processing circuit 72 then applies a well-known algorithm, such as a least squares algorithm, to the temperature data to create a best fit curve having the exponential decay properties of $e^{-t/TC}$, where TC is the thermal constant. Any other constants moving the entire curve up or down may be ignored since only the rate of decay is relevant. When TC equals t, the junction temperature has dropped to about 37% of the peak junction temperature. In another embodiment, the curve may also include linear equations or polynomial equations that affect the calculation of the time constant. In another embodiment, the best fit curve analysis is performed directly on the Vbe curve, obviating any need to calculate the temperatures associated with each Vbe measurement.

In step 80, the data processing circuit 72 calculates the thermal time constant TC from the best fit curve. TC may be the time constant of the temperature curve or the Vbe curve.

Figure 6:
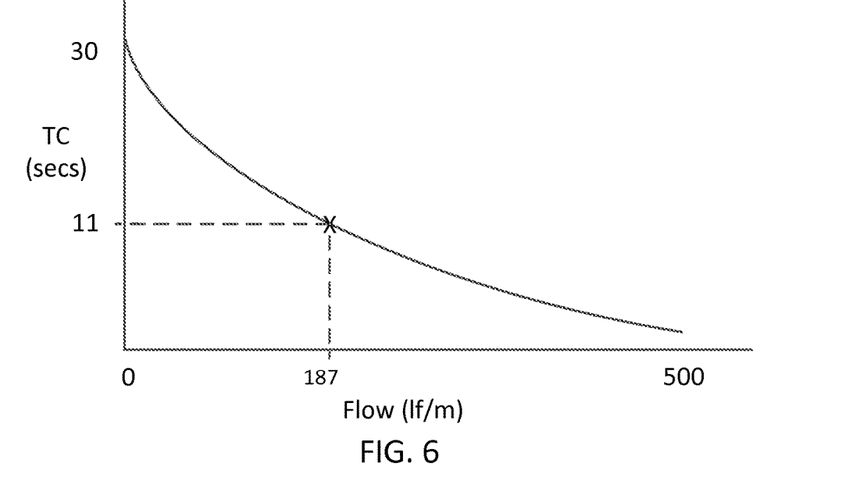
FIG. 6 is a graph illustrating how the derived thermal time constant of the best fit temperature curve equates to the flow rate of air.

In step 82, the data processing circuit 72 then uses a transfer function or look-up table to equate the TC to an air flow velocity. The transfer function is an algorithm that is created using experimental data to correlate the time constant to the air flow velocity. Different transfer functions may be used for different applications or air characteristics. In one embodiment, the transfer function is a fourth order transfer function. In another embodiment, a look-up table may be used to cross-reference the time constant to the air flow velocity. The transfer function or look-up table may generate the values shown in the TC vs. air flow graph of FIG. 6, where air flow is given in linear feet per minute. In the example, the time constant was calculated to be about 11 seconds, corresponding to an air flow velocity of 187 linear feet per minute. Any units may be used, such as miles per hour, etc. The graph of FIG. 6 (in the form of a transfer function or look-up table) may be generated empirically by the anemometer manufacturer during testing of a sample anemometer in an air flow chamber. The TC may be that of the temperature decay curve or the Vbe decay curve.

There may be a variety of transfer functions or look-up tables stored in the system for converting the TC to the air flow velocity, where the selection of the particular function or look-up table depends on measured ambient air temperature (air intake temperature), humidity, barometric pressure, etc., where such variables affect the rate of cooling of the base-emitter junction to varying degrees. For example, higher humidity, higher barometric pressure, or higher ambient temperature may each cause an air flow to cool the junction at a different rate. Such detectors may be remote from the PCB 10 (FIG. 1) and feed data to the data processing circuit 72 via the I/O pins 16. Such fine tuning of the air flow velocity measurement is not necessary in many applications where a precise measurement is not required.

The temperature of the PCB 10 (FIG. 1) may also affect the TC vs. air flow values if there is thermal coupling between the PCB 10 and the transistor 46 and the PCB 10 temperature fluctuates during a measurement cycle. The temperature sensor 24 may supply such PCB 10 temperature data to the data processing circuit 72 to correct for such transients.

Once the air flow velocity is determined, it may be output via the I/O pins 16 to an external monitor, or it may be compared to a pass/fail threshold programmed into the data processing circuit 72. The data processing circuit 72 may issue a warning signal if the air flow velocity is determined to be outside the acceptable range, as shown in step 84.

Other related techniques are also envisioned where the thermal time constant is derived to determine the air flow velocity.

Although the calculations have been delineated in FIG. 3 for clarity of explanation, the Vbe value set may be applied directly to an algorithm that derives the thermal time constant and the air flow velocity without the separate steps of calculating junction temperatures, etc. Such condensing of the algorithms is within the skills of those in the field of programming.

In another embodiment, the following expression may be used to derive a decay constant between any two Vbe samples, and a least squares technique is used to derive the best fit decay constant to the curve for the entire set of Vbe samples. The best fit decay constant then is used to determine the air flow velocity using a suitable look-up table. Hence, a time constant, related to a rate of decay of either Vbe or temperature, is used for deriving the air flow velocity.

$$Vbe(n+M)=Vbe(n)*(\text{decay constant})^M+\text{constant2} \qquad \text{Eq. 4}$$

Where, n is a sample (e.g., 1, 2, 3, etc.) and
n+M is the n+M sample (e.g., 2, 3, 4, etc.).

Other techniques may be used to measure the air flow using the basic anemometer structure of FIG. 1.

In one embodiment, a resistive heater is mounted on the PCB 10 next to the package 18, in the package 18, or under the package 18, and a current is applied to the heater to heat the package 18 during the heating cycle (FIG. 4) of the base-emitter junction.

In another embodiment, the package 18 may be initially cooled by, for example, a Peltier cooler located under the package 18. The junction is cooled for a period to create an initial temperature, then power to the Peltier cooler is removed. The rate of heating of the junction to ambient temperature, or any other temperature, is then related to the air flow velocity, and such velocity is calculated using techniques similar to those described above.

In another embodiment, the Vbe is measured at two known currents at periodic intervals during the cooling cycle. The temperature of the junction may then be calculated at each interval as:

$$T=[q/(n*k)]*[Vbe2-Vbe1]/\ln(Id2/Id1) \qquad \text{Eq. 3}$$

Where Vbe1 and Vbe2 are the base-emitter voltage drops at the currents Id1 and Id2, respectively.

The best fit exponential decay temperature curve is then calculated, and the thermal time constant TC (or the Vbe time constant) is then derived to determine the air flow velocity, as previously described.

In another technique, a first known power level is applied to the transistor 46 by controlling the voltage source 48 or resistor 50. After a certain delay to ensure the temperature has settled, the temperature of the base-emitter junction is then derived. The power is then increased to a second known current level, and the junction temperature is measured again after a certain time. The equation delta P/delta T then conveys the thermal resistance between the junction and the air while cancelling out any constants. The thermal resistance is related to the air flow velocity in a known manner, so air flow velocity may then be calculated. For example, for little or no air flow, an increased power will result in a large increase in junction temperature, while a high air flow will result in a lower increase in junction temperature. The change in temperatures can thus be cross-referenced to air flow velocity by using a transfer function or look-up table. This alternative technique is considered not as reliable as the technique of FIG. 3 where the thermal time constant is used to derive air flow velocity, since this alternative technique is more sensitive to temperature transients during the test time due to the longer settling time requirement. In a related embodiment, a suitable transfer function is directly applied to the changes in Vbe to derive the air flow velocity, where the transfer function takes into account the relationship between Vbe and the junction temperature.

The temperature curve analysis algorithm, or alternatively a Vbe curve analysis algorithm, may be designed to identify anomalous measurements indicative of thermal or air flow transients. If such anomalies are detected, the program disqualifies the measurement cycles, and the detection process is repeated.

In valuable equipment systems without an anemometer, periodic replacements of the air filters are performed in the event that they are blocked by dust or dirt. By using the present anemometer, there is no need to automatically replace the air filters at predefined intervals since it is assumed the filter is adequate if the air flow velocity is within the acceptable range. The proper operation of the fans is also determined by the anemometer.

Additionally, during the design of the equipment box (e.g., a server, slot machine, etc.), several of the anemometers may be distributed throughout the box where circuitry is located to determine if the air flow is adequate around that location. If not, the fan or circuitry location may be changed to achieve adequate cooling. In the final product, only one anemometer may need to be used proximate to the fan or air exit vent to determine the proper operation of the cooling system. However, valuable system data may be gathered from the field by leaving a full complement of anemometers in the final product.

Although air has been used as the fluid in the examples, the anemometer may be used to measure the flow velocity of any fluid, such as a liquid.

In addition to the PCB 10 circuitry providing the air flow velocity, the temperature sensor 24 or the base-emitter voltage drop of the transistor 46 may be used to convey ambient temperature between the air flow velocity measurement cycles, assuming the transistor temperature has settled. This ambient temperature may be transmitted to a remote monitor via the I/O pins 16, or a warning signal may be generated if the temperature is outside an acceptable range.

As a premise for accurate air (fluid) flow velocity measurement without requiring calibration, the anemometers should not significantly vary from one anemometer to the next. The transistor 46 specifications are adequately controlled by the manufacturer and specified in a data sheet. The precision of the other circuitry must also be adequately controlled and not significantly affected by ambient temperature. Any variation in circuit performance due to ambient (PCB 10) temperature variation may be corrected by measuring the temperature of the PCB 10 and making the corresponding corrections to the data. However, since the ambient temperature is assumed to change at a slow rate relative to the cooling period for the air flow velocity measurement, the correction due to changes in ambient temperature is considered optional for many applications.

Although the size and construction of the package 18 may vary due to manufacturing tolerances, the effects of such variations on cooling of the transistor 46 may be minimized by carefully controlling the dimensions and mass of the metal rod 22 heat sink. In other words, the characteristics of the metal rod 22 heat sink may be controlled to dominate the properties of the anemometer.

Since the dimensions of the metal rod 22 heat sink significantly affect the performance of the anemometer, the dimensions of the metal rod 22 should be carefully controlled to avoid the need for calibration. In experiments performed by the inventors, a 1% variation of the derived thermal time constant TC (under identical conditions) from one anemometer to the next results in about a 10% variation in the linear feet per minute air flow velocity calculation, which is significant.

A particularly important characteristic of the metal rod 22 is its mass, directly related to its volume. A variation in its diameter has been shown to be more significant than the same percent change in its height, since variations of the thermal mass of the rod 22 are cancelled to some degree by related variations in the surface area of the rod 22. The thermal time constant of the rod (thermal TC) is a function of the mass of the rod 22 divided by the surface area of the rod 22. Accordingly, the diameter of the rod 22 must be tightly controlled since it has the most effect on the thermal TC of the rod 22. In one example, a diameter tolerance of +/−0.25 mil and a height tolerance of +/−1 mil results in a +/−3.1% tolerance in the air flow velocity measurement, which is acceptable.

Since the mass of the rod 22 is much greater than the mass of the metal pad 20 of the package 18, variations in the thermal pad 20 are not very significant. The tolerances of the rod 22 can be more tightly controlled than the tolerances of the metal pad 20.

Figure 7:
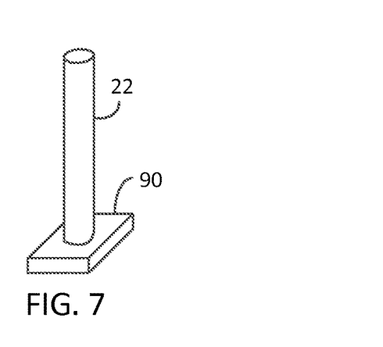
FIG. 7 is a perspective view of the cylindrical metal rod heat sink shown in FIG. 1 for omnidirectional air flow detection.
Figure 8:
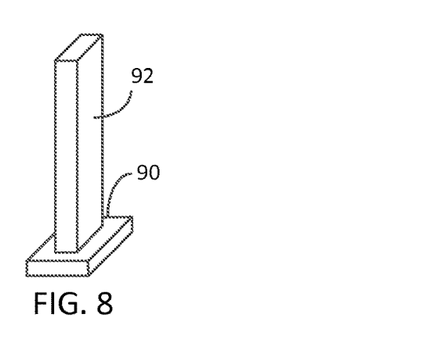
FIG. 8 is a perspective view of an elongated rectangular metal rod heat sink to provide directionality to the air flow sensing.

FIG. 7 shows the cylindrical rod 22 of FIG. 1 having a metal base 90 for soldering to the metal pad 20 (FIG. 1) of the package 18. The shape of the rod 22 may be varied for directionality, since the effective surface area exposed to the air flow can be directionally controlled. For example, as shown in FIG. 8, the rod 92 may be a rectangular column to increase its surface area exposed to the air flow if the wider flat surface of the rod 92 were angled normal to the direction of the air flow. Multiple rods 22/92 may be attached to a single base 90, such as one rod per corner of the base 90, where the orientation of the rod array changes the surface area exposed to the air flow.

If the tolerances of the metal rod 22 heat sinks are not very controllable (e.g., greater than 1%), then calibration of the anemometer may be needed if high accuracy of the air flow velocity determination is required. Calibration may be done with zero air flow velocity. However, for a pass/fail air flow detector, no calibration is needed.

Since the temperature of a sensor with a larger thermal TC generally reacts more slowly to changes in air flow, the mass of the rod 22 (and to a lesser extent, its surface area) affects the ability of the anemometer to respond to air flow transients. So the rod 22 may be specifically designed for a particular application to control the anemometer's sensitivity to air flow transients. In contrast to a hot wire, the thermal TC of a hot wire is very small, so the wire is very sensitive to air flow transients, requiring electronic averaging techniques to derive the average air flow velocity.

In one embodiment, instead of a transistor 46 being used as the temperature sensor, a diode or resistor may be used if it can be sufficiently heated by a high current during the heating cycle.

Figure 9:
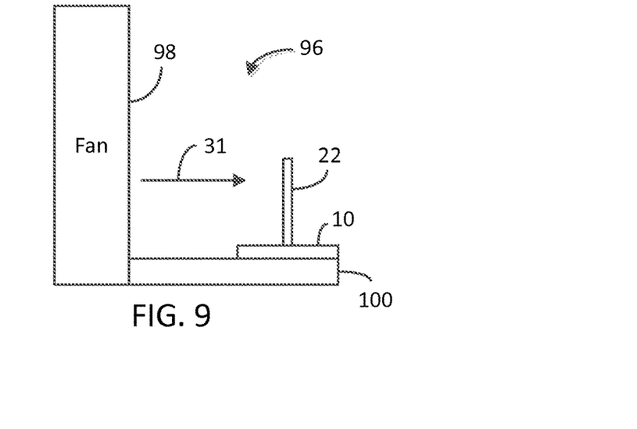
FIG. 9 illustrates a fan assembly including the anemometer.

FIG. 9 illustrates a fan assembly 96 including the anemometer. A fan 98 has a frame that is molded to provide a support arm 100 for the PCB 10 and the anemometer. The rod 22 heat sink is shown. A cable that supplies power and control to the fan 98 also electrically connects to the pins 16 (FIG. 1) on the PCB 10. Thus, the PCB 10 is thermally insulated from other equipment and optimally located in front of the fan 98 to detect any obstruction of air at the air intake port or any malfunction of the fan. The anemometer algorithms and look-up tables may be calibrated for the fan assembly 96, resulting in extremely accurate air flow velocity measurements.

While particular embodiments of the present invention have been shown and described, it will be obvious to those skilled in the art that changes and modifications may be made without departing from this invention in its broader aspects. The appended claims are to encompass within their scope all such changes and modifications as fall within the true spirit and scope of this invention.

What is claimed is:

1. A method of manufacturing an anemometer used for determining a fluid flow comprising:
providing a temperature sensor having electrical characteristics that vary with temperature, the temperature sensor being thermally coupled to a metal base; and
providing a metal rod having one end configured for attachment to the base, the entire rod having a mass, wherein providing the rod comprises:
calculating the mass of the rod needed to achieve a desired reaction of the temperature sensor to transients in the fluid flow, wherein different masses of the rod vary the reaction of the temperature sensor to transients in the fluid flow;
manufacturing the rod to have the calculated mass; and
attaching the rod to the metal base so that the entire rod is within the fluid flow to be measured and the rod is heated when the temperature sensor is heated.

2. The method of claim 1 wherein the rod has a fixed cross-section and a length dimension, wherein the length dimension is selected to cause the mass of the rod to be the calculated mass, and wherein the length dimension is substantially normal to a primary direction of the fluid flow.

3. The method of claim 2 wherein the rod is cylindrical.

4. The method of claim 2 wherein a cross-section of the rod is rectangular.

5. The method of claim 1 wherein the rod has a length dimension, wherein the length dimension is substantially normal to a primary direction of the fluid flow.

6. The method of claim 1 wherein manufacturing the rod to have the calculated mass avoids a need for calibrating the temperature sensor.

7. The method of claim 1 wherein the entire rod is straight.

8. The method of claim 1 wherein the entire rod is straight and perpendicular to the metal base.

9. The method of claim 1 further comprising positioning the anemometer within the fluid flow so that the entire rod is within the fluid flow.

10. The method of claim 1 wherein the temperature sensor comprises a diode junction that is a base-emitter junction of a bipolar transistor.

11. The method of claim 10 wherein the bipolar transistor is heated by applying a current through an emitter and collector of the transistor.

12. The method of claim 1 wherein attaching the rod to the metal base comprises attaching the rod via a solder.

13. The method of claim 1 further comprising:
providing a first circuit coupled to the temperature sensor and configured to heat up the temperature sensor with a heating current through the temperature sensor for a first period of time and then remove the heating current to allow the temperature sensor to cool; and
providing a second circuit configured to detect a signal from the temperature sensor, when the heating current is removed from the temperature sensor, corresponding to a temperature of the temperature sensor and determine the fluid flow based on a rate of decay of the temperature of the temperature sensor while the temperature sensor is cooling.

14. The method of claim 13 wherein the temperature sensor comprises a diode junction that is a base-emitter junction of a bipolar transistor, wherein the first circuit applies a heating current through an emitter and collector of the transistor, and wherein the second circuit comprises a detector for measuring a changing voltage drop across the base-emitter junction of the transistor after the heating current is removed.

\* \* \* \* \*